Fig. 1.

INVENTOR.
Floyd J. Bydalek
BY
Seegert & Schwalbach
Att'ys

April 12, 1960

F. J. BYDALEK

2,932,307

ELECTROMAGNETIC CONTROL DEVICE WITH MANUAL OPERATOR AND OVERCALLING CONTROL MEANS

Filed Aug. 30, 1954

INVENTOR.
Floyd J. Bydalek
BY
Seegert & Schwalbach
Att'ys

April 12, 1960

F. J. BYDALEK 2,932,307

ELECTROMAGNETIC CONTROL DEVICE WITH MANUAL
OPERATOR AND OVERCALLING CONTROL MEANS

Filed Aug. 30, 1954

INVENTOR.
Floyd J. Bydalek
BY
Seegert & Schwalbach
Attys

April 12, 1960

F. J. BYDALEK 2,932,307

ELECTROMAGNETIC CONTROL DEVICE WITH MANUAL
OPERATOR AND OVERCALLING CONTROL MEANS

Filed Aug. 30, 1954

INVENTOR.
Floyd J. Bydalek
BY
Seegert & Schwalbach
Attys

United States Patent Office 2,932,307
Patented Apr. 12, 1960

2,932,307

ELECTROMAGNETIC CONTROL DEVICE WITH MANUAL OPERATOR AND OVERCALLING CONTROL MEANS

Floyd J. Bydalek, Milwaukee, Wis., assignor to Baso Inc., a corporation of Wisconsin Application August 30, 1954, Serial No. 452,776

10 Claims. (Cl. 137—66)

This invention relates to improvements in control devices, more particularly fluid fuel control devices which include an electromagnetic operator for actuating a valve or the like for controlling the flow of fuel to a fluid fuel burning apparatus responsive to changes in temperature or other condition.

It is a general object of the present invention to provide an improved fuel flow controlling apparatus having a fuel control valve operated between open and closed positions by an electromagnetic operator responsive to changes in the condition, said control device having overcalling control means associated with said operator in a novel manner to effect closure of said fuel control valve on occurrence of a predetermined condition, for example pilot or ignition burner outage.

Another object of the invention is to provide in a control device of the aforementioned character, manually operable means for actuating the fuel control valve to and retaining the latter in a fuel flow permitting position on power failure, said overcalling control means being resettable and operatively associated with said manually operable means, said control means being operable on occurrence of a predetermined condition to release the valve from retention by said manually operable means and to render said manually operable means inoperative until said overcalling control means is subsequently reset.

Another object of the invention is to provide an improved control device of the character described wherein release of the valve from retention in flow permitting position by the manually operable means can also be effected either by manual actuation of said manually operable means or by resumption of power to the electromagnetic operator.

Another object of the invention is to provide a control device of the class described wherein the overcalling control means is also operatively associated with a switch in the power supply circuit to the electromagnetic operator and is operable to actuate said switch and thereby interrupt the flow of current to said electromagnetic operator simultaneously with disablement of the manually operable means.

A more specific object of the invention is to provide a control device of the character set forth wherein the overcalling control means takes the form of a resettable thermoelectrically powered electromagnetic control having reset and released positions and there is novel means provided for actuating the switch to interrupt the power circuit to the electromagnetic valve operator on actuation of the reset mechanism, retention of said control means in reset position by thermoelectric energization thereof, permitting closure of said switch on return of said reset mechanism to its original position, thereby preventing energization of the electromagnetic valve operator and flow of main fuel during a resetting operation and permitting such energization only after the resetting operation has been successfully completed. This feature is known in the art as flow interruption.

Another object of the invention is to provide an improved fuel flow controlling device of the aforementioned character having a condition responsive circuit controlling device in the thermoelectric circuit for the overcalling control means and providing for interruption of the current flow to said control means in the event of a predetermined condition, for example a high limit temperature.

A further object of the invention is to provide an improved control device of the class described wherein the valve member is movably mounted within a valve body, and the electromagnetic operator, manually operable means, and overcalling control means are removable from the valve body as a unit, there being a readily separable and reengageable force transmitting connection between the electromagnetic operator and said valve, separable by removal of said unitary mechanism from the valve body.

Other objects and advantages of the invention will appear as the description proceeds, reference being had to the drawings accompanying and forming a part of this specification wherein.

Figure 1:
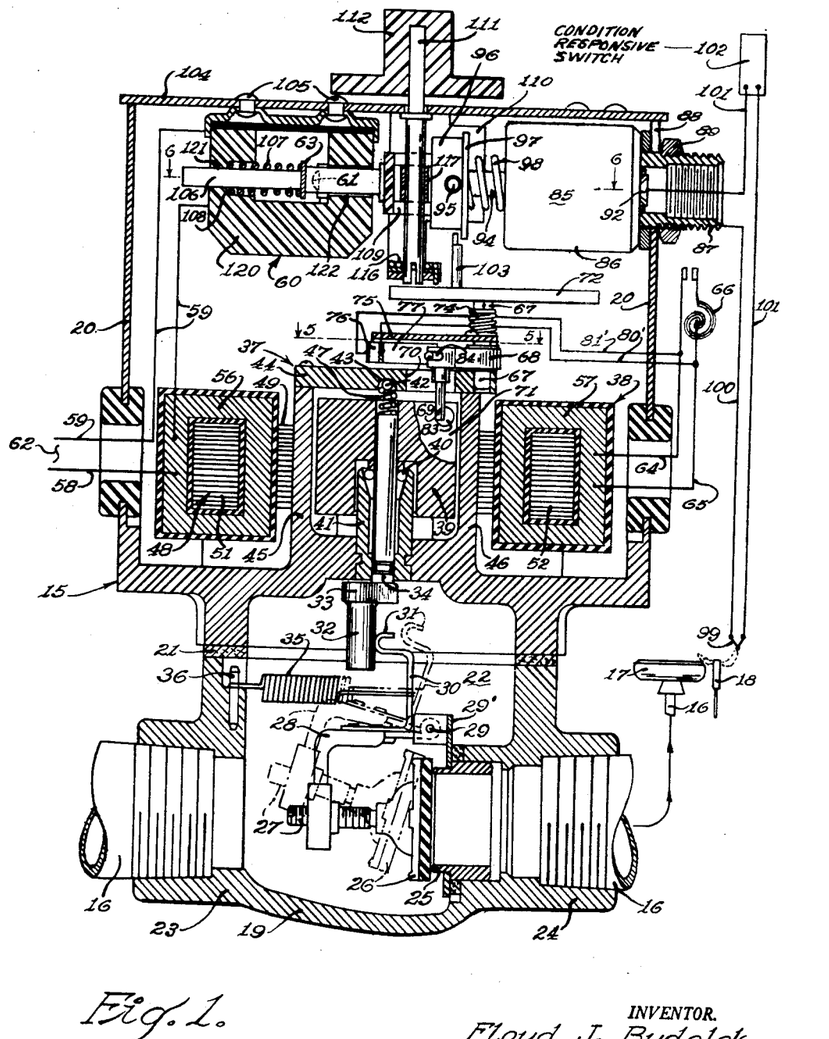
Figure 1 is a longitudinal vertical sectional view of one form of fuel flow controlling device constructed in accordance with the invention.

Referring now to Figure 1, the improved control device is indicated generally by the numeral 15, and in the illustrated arrangement, controls the flow of fluid fuel through a supply pipe 16 to a main fuel burner 17 of fluid fuel burning apparatus (not shown), said apparatus also including a pilot or ignition burner 18 in coacting relationship with said main burner. The control device 15 comprises a valve body 19 and a control casing 20 mounted thereon and forming a cover for said valve body sealingly engaging the latter as by means of a gasket 21.

The valve body 19 is provided with a chamber 22 and has inlet and outlet connections 23 and 24 respectively communicating therewith. Within the chamber 22 the valve body is provided with an annular valve seat 25 at the inner end of the outlet connection 24. A valve or flow controlling member 26 cooperates with the valve seat 25 to control the flow of fluid through the outlet connection 24 and therefore to the burner 17. The valve member 26 is carried by a stem 27 with which it preferably has a loose or pivotal connection permitting self accommodation of the valve member 26 on the seat 25. The stem 27 has an adjustable connection, for example a relatively high friction threaded connection, with an L-shaped valve arm 28 mounted for pivotal movement on a pin 29 carried by a bracket 29' fixed within the valve body 19. An actuating arm 30 is fixed, as by riveting, to the valve arm 28 and has a reversely bent end portion 31 for engagement by an actuating member which may take the form of an eccentric pin 32 depending from a crank arm 33 fixed to a rotary operating shaft 34 extending into the chamber 22 as shown. A helical spring 35 anchored at one end to a pin 36 fixed to the valve body 19 and connected at its other end to the arm 30, provides means for biasing the arm 30 into engagement with the eccentric pin 32 and the valve member 26 toward the seat 25.

An electromagnetic operator 37 is provided for effecting rotation of the operating shaft 34 and thereby actuation of the valve member 26. The operator 37 is disposed within the control casing 20 and comprises a power unit 38 and a rotor or rotary armature 39 of magnetically permeable material.

The rotor 39 is positioned for turning movement between bearings as illustrated by the bearing at 40 between the underside of the rotor 39 and the upper end of a sleeve 41 carried by and projecting through the bottom wall of the control casing 20 and by a thrust bearing 42. The thrust bearing 42 comprises a ball seated in a recess 43 in the underside of a bearing plate 44 mounted on the upper ends of a pair of spaced upstanding arms 45 and 46 formed in the bottom wall of the control casing 20 and disposed on opposite sides of the rotor 39. A coiled compression spring 47 has one end in engagement with the ball 42 and has its other end trapped in an axial recess in the rotor 39 as shown. The rotor 39 is fixed to the shaft 34 so that said shaft will turn with turning movement of the rotor.

The power unit 38 comprises a magnetic core 48 of laminated or other suitable form. The particular core or magnetic frame 48 selected for illustration is of generally rectangular configuration comprising a pair of parallel side legs 49 and 50 (see Figure 9) magnetically connected by parallel end legs 51 and 52. Integrally formed on the side legs 49 and 50 of the core 48 are pole pieces having arcuate pole faces 53 and 54 (see Figure 9) defining between them an air gap 55 into which the magnetic armature 39 is adapted to be drawn by rotation.

The power unit 48 further comprises a primary winding 56 wound on the end leg 51 of the frame 48 and a secondary winding 57 wound on the end leg 52 of the frame 48. The primary winding 56 is adapted to be connected to a suitable source of electric energy, for example a source of alternating current indicated symbolically at 62, and such connection may be made by conductors 58 and 59. A switch 60 having contacts 61 and a contact maker 63 may be interposed in the conductor 59 as shown most clearly in Figure 9. The secondary winding 57 is preferably connected in circuit with condition responsive means, for example a thermostat 66, by conductors 64 and 65.

Figure 9:
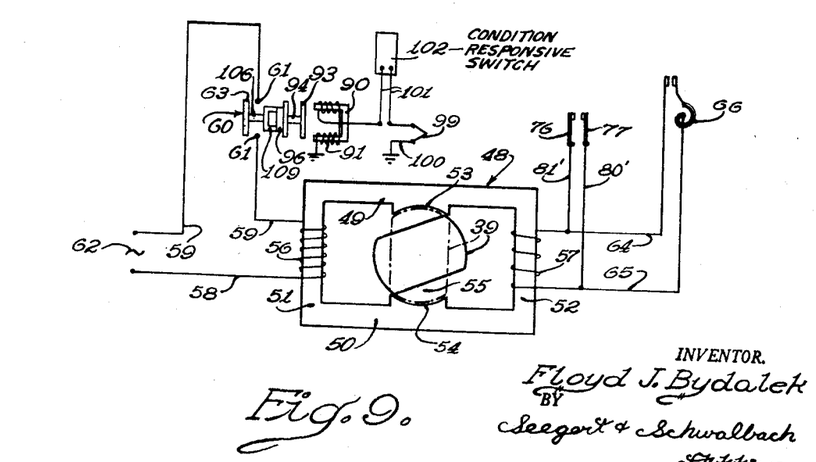
Figure 9 is a schematic electrical diagram illustrating the wiring circuits of the improved control device.

It will be understood that when the primary winding 56 is energized and the circuit of the secondary winding 57 is open, the magnetic flux created in the core or frame 48 by energization of the primary winding 56 tends to flow around the frame through the end leg 52 thereof in preference to flowing across the air gap 55 between the pole faces 53 and 54, whereas when the secondary winding circuit is closed, induced currents in the secondary winding 57 divert the magnetic flux from the primary winding across the air gap 55 to cause turning movement of the rotor 39 from the position shown in solid lines in Figure 9 to the position shown in dot and dash lines in said figure. Suitable top means (not shown) is provided to prevent clockwise rotation of the rotor 39 from the solid line position shown in Figure 9, and the bias of the spring 35, acting through the arm 30, eccentric pin 32, crank arm 33, and shaft 34 serves, when the electromagnetic operator is deenergized, to bias the rotor 39 to said solid line position and the valve member 26 to closed position.

Electromagnetic operators of the type of which the operator 37 is an illustrative example afford advantages not found in conventional electromagnetic operators such as solenoid operators. For example the operator 37 affords improved efficiency in transformation from electrical to mechanical energy, thereby affording increased output for a given size unit. Further, the improved operator affords maximum rotor torque at the start of rotor movement when it is most desired, as distinguished from conventional solenoid operators which afford the least power at the beginning of their armature movement. Another feature inherent in the improved operator is the provision of a magnetic stop which defines the actuated position of the rotor without the need for mechanical stops, thereby affording quiet operation. Still another feature of the improved operator is the fact that the power unit 38 constitutes a step-down current limiting transformer wherein the electric energy produced in the secondary winding 57 is relatively low and substantially constant, so that condition responsive or other control apparatus connected in circuit therewith are not deleteriously affected by energization of the primary, and so that insulation required for line voltages is unnecessary in the aforementioned secondary circuit. Further, the improved operator has low standby power requirements and is immune to short circuits in the secondary winding from the standpoint of damage due to overheating.

Manually operable means is provided for opening the valve 26 in the event of power failure, opening of said valves being accomplished by mechanism for effecting rotation of the motor 39. The aforementioned manually operable means comprises a shaft 67 mounted for rotary movement in a bearing opening in the bearing plate 44 and having non-rotatably connected thereto a crank 68 which carries a depending eccentric pin 69. The pin 69 extends through an opening 70 in the bearing plate 44 for coaction with the arcuate side wall surface of an arcuate recess 71 in the adjacent side of the rotor 39. Also non-rotatably connected to the shaft 67 is a generally semi-circular plate or finger piece 72, the periphery of which is preferably knurled and extends through a slot 73 in the side wall of the casing 20 as most clearly shown in Figures 2 and 3, for manual access thereto.

Figure 5:
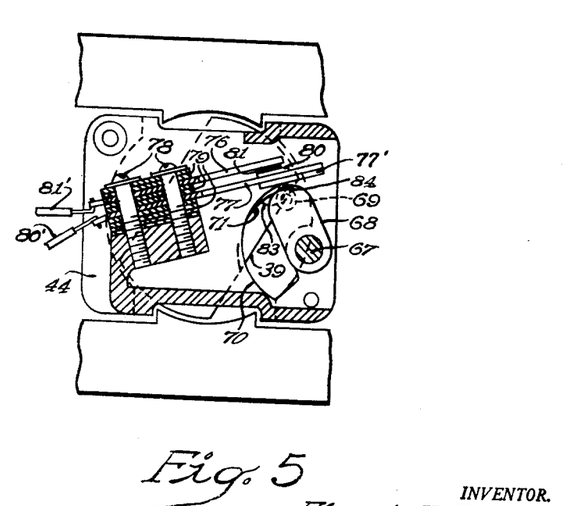
Figure 5 is a fragmentary sectional plan view taken approximately along the line 5—5 of Figure 1.

The plate 72, shaft 67 and crank 68 are biased to inoperative or released position by a coiled spring 74 surrounding the shaft 67 and anchored at one end to a contact spring support 75 mounted on the bearing plate 44, and anchored at its other end to the shaft 67. The support 75 carries a pair of spring leaves 76 and 77 secured to said support, for example, by screws 78 with insulating strips 79 interposed between said leaves and said support as shown in Figure 5. The leaf 77 carries a contact 80 which is biased out of engagement with a contact 81 carried by the leaf 76. The contact leaves 76 and 77 are connected in circuit with the secondary winding 57 of the power unit 48 and in shunt with the terminals of the thermostat 66 as by conductors 80' and 81'. It is apparent that when the contacts 80 and 81 are in engagement, the circuit for the secondary winding 57 is closed regardless of the condition of the thermostat 66.

Figure 11:
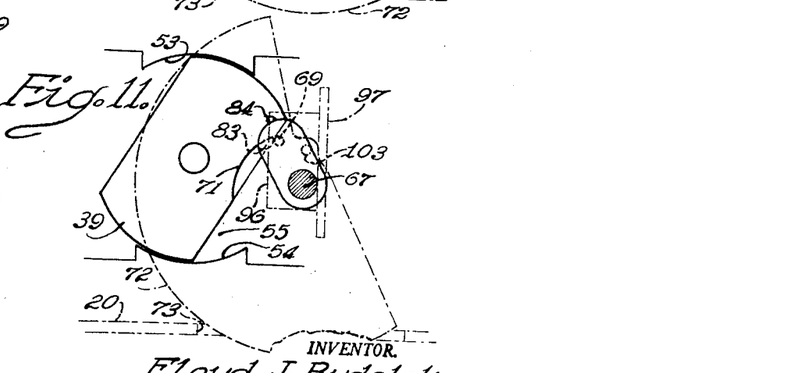
Figure 11 is a view similar to Figure 10 illustrating the relationship of the parts when the manual operating means is in actuated position, the armature being shown in the intermediate position to which it is moved and in which it is retained by the manual operating means.

Means is provided for retaining the rotor 39 and the valve 26 in the positions to which they are moved by actuation of the manual operator, said positions preferably being intermediate positions short of the positions to which they are moved by the electromagnetic operator. The aforementioned intermediate position of the rotor 39 is illustrated in Figures 5 and 11, and the corresponding position of the valve 26 is illustrated in dot and dash lines in Figure 1. The recess 71 of the rotor 39 is provided with a rounded projection 83 which may take the form of the head of a screw or rivet threaded or pressed into the rotor 39, said projection being positioned for coaction with the eccentric pin 69 as shown in Figures 5 and 11.

Means is provided for moving the contact 80 into engagement with the contact 81 by turning movement of the finger piece 72 simultaneously with opening of the valve 26 which is also accomplished by said turning movement. For this purpose the crank 68 carries an insulating nib 84 which engages the leaf spring 77 and presses the contact 80 into engagement with the contact 81 as the crank 68 is turned to the position shown in Figures 5 and 11. This closes the circuit for the secondary winding 57 of the power unit 48 regardless of the condition of the thermostat 66. The spring leaf 77 is provided with an integral non-resilient reinforcing member 77' (Figure 5) to prevent deformation of the portions of said leaf outwardly of the contact 80. Lost motion which might otherwise result from such deformation is thereby prevented.

Figure 2:
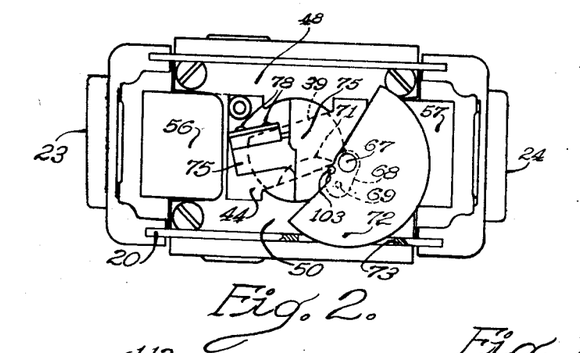
Figure 2 is a plan view of the improved control device with the cover and most of the mechanism mounted thereon removed, portions of the manual valve operating means being shown, partly in section, for the sake of clarity.
Figure 3:
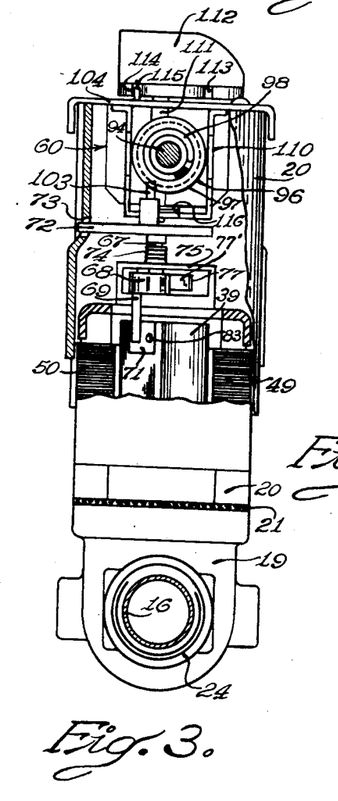
Figure 3 is an end elevational view of the improved control device as viewed from the right in Figure 1, parts being broken away to more clearly show the manual valve operating means.
Figure 10:
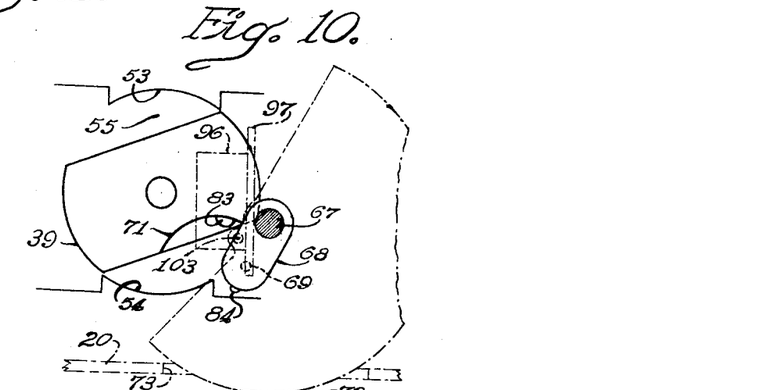
Figure 10 is an enlarged diagrammatic plan view illustrating the relationship of the parts of the manual operating means, the electromagnetic operator armature, and the coacting portion of the overcalling control means when the manual operating means is in released position, the armature in valve closing position, and the overcalling control means in reset or operating position.

To manually open the valve 26, for example on failure of the power source 62, the finger piece 72 is rotated in a clockwise direction as viewed in Figures 2, 10 and 11 to thereby turn the crank 68 clockwise from its position shown in Figures 1 to 3, and 10 to its position shown in Figures 5 and 11. During this movement of the crank 68, the pin 69, by engagement with the arcuate wall of the recess 71 of the rotor 39, turns said rotor from its position shown in Figures 1 to 3 and 10 to the intermediate position shown in Figures 5 and 11. Movement of the rotor 39 to the intermediate position moves the valve 26 to its intermediate flow permitting position shown in dot and dash lines in Figure 1. The aforementioned movement of the crank 68 also causes the nib 84 to move the contact 80 into engagement with the contact 81 and thereby close the circuit of the secondary winding 56.

As the crank 68 approaches the position thereof shown in Figures 5 and 11, the pin 69 moves beyond and becomes engaged behind the projection 83 on the rotor 39. By this engagement the rotor 39 and the valve member 26 are held in the aforementioned intermediate positions thereof. It will be noted that when the pin 69 slides over the projection 83, the rotor is thereby turned counterclockwise slightly beyond the position shown in Figures 5 and 11. Then, as the pin 69 moves behind the projection 83 the rotor moves in a clockwise direction to its position in Figures 5 and 11.

Resumption of electric power from the source 62 causes current to be induced in the secondary winding 57 of the power unit 48 thereby causing diversion of flux across the air gap 55 and turning movement of the rotor 39 in a counterclockwise direction from the intermediate position of Figures 5 and 11 to the position shown in dot and dash lines in Figure 9. This rotor movement causes corresponding movement of the valve 26 from its intermediate position to its full open position. As the rotor so moves, the projection 83 becomes disengaged from the pin 69, and the spring 74 thereupon returns said pin, crank 68 and finger piece 72 to their released positions shown in Figures 1 to 3 and 10. The rotor 39 and valve 26 are thus automatically returned to control by the thermostat 66 on resumption of power.

It will be noted that if the crank 68 is turned to the position of Figures 5 and 11 while the power is on and the thermostat 66 is calling for heat, the pin 69 will not engage the rotor 39 to impart rotation thereto because said rotor is in the position illustrated by the dot and dash lines in Figure 9. On the other hand, if the crank 68 is rotated to its position in Figures 5 and 11 while the power is on and the thermostat 66 is not calling for heat, the rotor is turned by the pin 69 to the position of Figures 5 and 11, and the contacts 80 and 81 are simultaneously engaged, said engagement closing the circuit of the secondary winding 57 as aforedescribed and thereby causing immediate further rotation of the rotor 39 to the position thereof illustrated in dot and dash lines in Figure 9. This, of course, moves the projection 83 away from the pin 69 and permits return of the manual operator to released position under the bias of the spring 74. A safety feature is thus provided which prevents locking of the rotor 39 in intermediate position when the power is on and thereby insures that the valve 26 will be operated under the control of the thermostat 66 as long as the power is being supplied to the electromagnetic operator 37.

Figure 4:
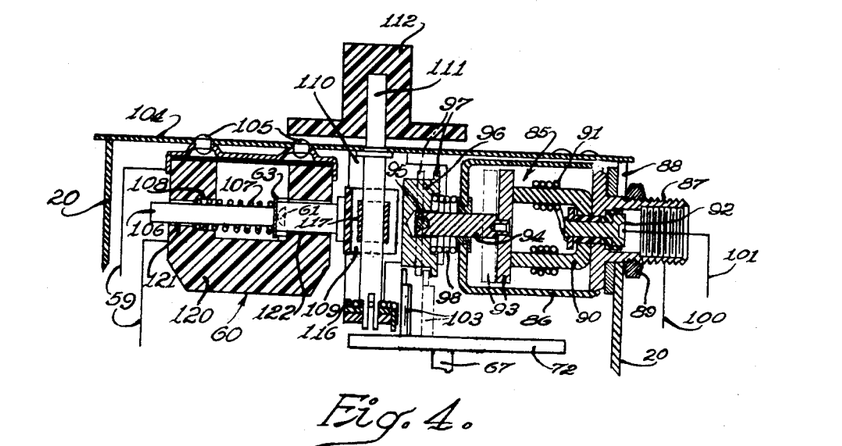
Figure 4 is a fragmentary longitudinal vertical sectional view similar to Figure 1 and illustrating a structure of one form of overcalling control means constructed in accordance with the invention.

Safety shut-off or overcalling control means is provided for effecting closure of the valve member 26 on occurrence of a predetermined condition, for example pilot burner outage or high limit temperature condition, said safety shut-off means being effective to overcall the operating mechanisms and insure disposition of said valve in its closed position even though the valve 26 may be, at the time of occurrence of such condition, held open by the electromagnetic operator 37 or by the manually operable mechanism. The aforementioned safety shut-off means comprises an electromagnetic safety shut-off device 85 having a housing 86 provided with an externally threaded socket member 87 projecting therefrom. The device 85 is mounted on a wall of the casing 20 with the socket member 87 positioned in a slot 88 extending inwardly from the upper edge of said wall, there being a nut 89 threaded on the socket 87 for effecting securement of the housing 86 to the wall 20 as shown in Figures 1 and 4.

Fixed within the housing 86 is an electromagnet frame 90 provided with an energizing coil 91 one end of which is grounded to the housing 86 in the usual manner, and the other end of which is connected in circuit with an insulatably mounted terminal tip 92 having a portion exposed within the socket 87 as shown. An armature 93 is disposed within the housing 86 and is fixed to a slidable stem 94 for movement toward and away from the pole faces of the magnet frame 90. The stem 94 extends through a suitable bearing in the end wall of the housing 86 and is connected, as by pin 95, to an abutment or actuating member 96 which is preferably formed with peripheral abutment means in the form of a flange 97. Positioned around the stem 94 and compressed between the member 96 and the adjacent end wall of the housing 86 is a helical spring 98. The spring 98 biases the member 96, stem 94 and armature 93 toward the left as viewed in Figures 1, 4, and 6 to 8, thereby biasing the armature 93 out of engagement with the magnet frame 90. Figure 4 illustrates in solid lines the operating position of the member 96 when the armature 93 is in attracted or operating position in engagement with the magnet frame 90. Figure 4 also illustrates in dot and dash lines the released or safety position of the armature and of the flange 97 of member 96. Figure 1 also illustrates the released or safety position of the member 96.

The safety shut-off device 85 is energizable from a suitable source of power, as for example a thermoelectric generator 99, which may take the form of a thermocouple. The generator 99 is positioned adjacent the pilot burner 18 and is subject to the heat of the flame thereof shown in dotted line in Figure 1. The generator 99 has one terminal thereof connected in circuit with the socket member 87 by means of a conductor 100, and the other terminal of said generator is connected in circuit with the terminal tip 92 by means of a conductor 101. The latter conductor may have interposed therein a condition responsive circuit controlling device 102 which may take the form of a thermostat responsive to a predetermined high limit temperature to interrupt the circuit between the generator 99 and the electromagnet coil 91. Energization of the coil 91 by current from the generator 99 produces sufficient flux flow in the frame 90 and armature 93 to hold said armature in attracted or operating relation with respect to said frame and thereby to hold the actuating member 96 in the operating position illustrated in Figure 4 against the bias of the spring 98. On occurrence of the predetermined condition to which the device 102 is responsive, for example high limit temperature, or upon outage of the pilot burner 18, the coil 91 becomes deenergized, and the magnetic attraction between the frame 90 and the armature 93 drops to below that necessary to overcome the bias of the spring 90, whereupon the armature 93, stem 94 and actuating member 96 move to the released or safety position thereof illustrated in Figures 1 and 6 and in dot and dash lines in Figure 4.

Coaction between the safety shut-off device 85 and the manual operating mechanism is afforded by abutment means in the form of an upstanding pin 103 carried by the finger piece 72. The upper end of the pin 103 is positioned adjacent the abutment member 96 as shown, and is engageable by the flange 97 of said member. When the manual operating mechanism is in its released position, the pin 103 is positioned as shown in Figures 1, 2, 4 and 10. When the member 96 is in attracted position as shown in solid lines in Figures 4, 7 and 8, and in dot and dash lines in Figure 11, the finger piece 72 can be manually rotated to the dot and dash line position thereof shown in Figure 11 to open the valve 26 and simultaneously move the pin 103 to dot and dash line position thereof illustrated in Figures 4 and 11. On deenergization of the electromagnet coil 91, however, movement of the member 96 to released or safety position under the bias of the spring 98 causes the flange 97 thereof to engage the pin 103 and move the latter to the left to its released position illustrated in solid lines in Figure 4. Figure 10 also illustrates in dot and dash lines the released position of the pin 103 and abutment member 96. This releasing movement, of course, causes counterclockwise rotation of the finger piece 72 from its actuated position illustrated in dot and dash lines in Figure 11 to the released position thereof illustrated in dot and dash lines in Figure 10, thereby effecting release of the rotor 39 by disengagement of the pin 69 therefrom and allowing closure of the valve 26 and return of the rotor to its position shown in Figures 1, 9 and 10 under the bias of the spring 35. At the same time the manual operating mechanism is permitted to return to its released position under the bias of the spring 74.

It should be noted that the improved control is so constructed that when the safety shut-off device 85 is released, the finger piece 72 cannot be rotated from its released position to its position shown in dot and dash lines in Figure 11 by digital engagement of the periphery of said finger piece. The reason for this is that the torque which can be developed by such engagement is insufficient to overcome the force of the springs 35, 74 and 98 resisting such rotation, the spring 98 affording the major portion of such resistance. As pointed out previously, however, the finger piece can be readily rotated in this manner if the abutment or actuating member 96 is held in operating position by the safety shut-off device 85. It is apparent, therefore, that the safety shut-off device 85 is operable on occurrence of a predetermined condition to overcall the manual operating mechanism and effect closure of the valve 26 if held open by said mechanism, and it is also operable to prevent opening of said valve by said mechanism.

Electrical coaction between the safety shut-off device 85 and the electromagnetic operator 37 is afforded by the switch 60 which is mounted on the cover 104 of the casing 20, as by rivets 105. The switch 60 has a generally cup shaped rectangular body 120 of insulating material within which the electrical contacts 61 are mounted in insulated spaced relation. The contact maker or control member 63 is carried by a stem 106 slidable axially in bearing openings 121 and 122 formed in the body 120, and said contact maker and stem are biased toward the right as viewed in Figures 1 and 4 by a spring 107. The spring 107 surrounds the stem 106 and has one end in abutment with the contact maker 63, the other end of said spring being seated in an enlarged diameter portion 108 of the opening 121 as shown. The spring 107 is thereby effective to bias the contact maker 63 toward an operating position in engagement with the contacts 61. The ends of the stem 106 project from the body of the switch 60 as shown, and the end adjacent the actuating member 96 of the safety shut-off device 85 carries abutment means in the form of a generally U-shaped abutment member 109 cooperable with the member 96.

Figures 6, 7, 8:
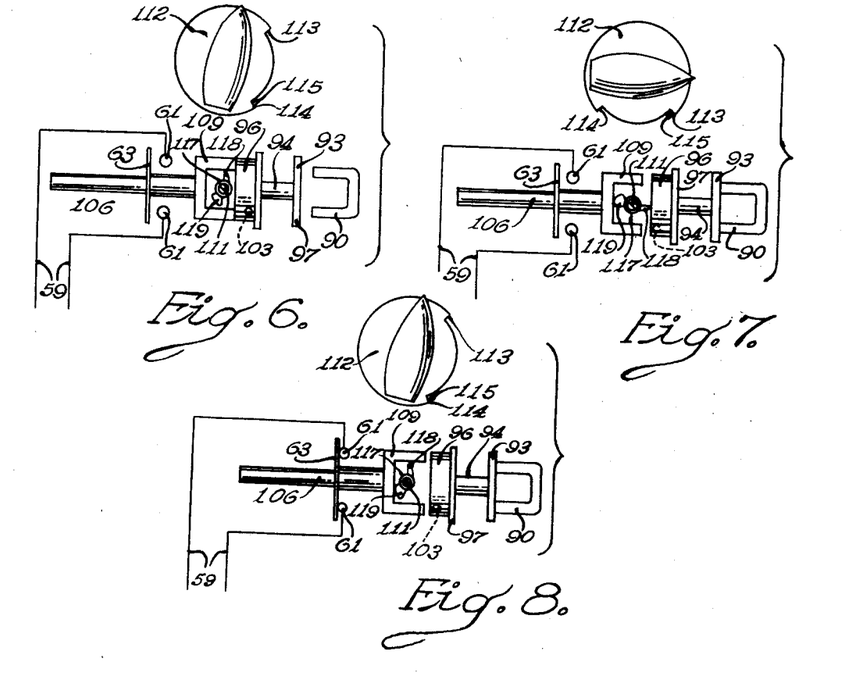
Figure 6 is a semi-diagrammatic view illustrating the relationship of the parts of the overcalling control means, line powered switch and the manual reset knob and cam when the parts are in the "off" position illustrated in Figure 1.
Figure 7 is a semi-diagrammatic view similar to Figure 6 and illustrating the parts thereof in reset position.
Figure 8 is a view similar to Figures 6 and 7 illustrating the relationship of the parts in the "on" position of Figure 4.

The position of the parts is such that when the safety shut-off device 85 is energized and the armature 93 and abutment member 96 thereof are in attracted, i.e., operating, position the spring 107 of the switch 60 biases the contact maker 63 into engagement with the contacts 61 as shown in Figure 8, thereby completing the electrical circuit between the source 62 and the primary winding 56 of the power unit 48. Deenergization of the safety shut-off device 85 and movement of the armature 93 and abutment member 96 to released or safety position under the bias of the spring 98, causes the abutment member 96 to engage the abutment member 109 of the switch 60 and move the latter to the left to the safety position illustrated in Figures 1 and 6, thereby disengaging the contact maker 63 from the contact 61 and opening the power circuit to the primary winding 56 of the power unit 48. Opening of this primary circuit, of course, completely deenergizes the electro-magnetic operator 37, and the biasing spring 35 thereupon returns the rotor 39 and valve 26 to their positions shown in Figures 1 to 3 and 9. It is apparent that the coaction between the safety shut-off device 85 and switch 60 affords a safety feature whereby the valve 26 is closed in response to a predetermined condition occurring during normal supply of power from the source 62, whether the condition responded to is outage of the pilot burner flame or a condition to which the circuit controlling device 102 is responsive.

Means is provided for resetting the armature 93 of the electromagnetic safety shut-off device 85 to the pole faces of the magnet frame 90 and for simultaneously preventing opening of the valve member 26 by the electromagnetic operator 37 during such a resetting operation. The aforementioned means comprises a generally U-shaped apertured bracket 110 depending from the cover 104 and providing a bearing for the lower end of a rotatable vertical shaft 111 which extends through an opening in the cover 104. The shaft 111 non-rotatably carries a knob or finger piece 112 at its upper end. As shown in Figures 6 to 8, the knob 112 may have a circular base portion, with the upper portion thereof taking the form of manually engageable pointer means. A portion of the periphery of the base portion of the finger piece 111 may be cut away as shown to provide shoulders 113 and 114 which are engageable with an upturned stop member 115 projecting from the cover 104 as shown most clearly in Figure 3. A torsion spring 116 surrounds the lower end of the stem 111 and has one end thereof anchored to the bracket 110, the other end of said spring 116 being anchored in a slot formed in the lower end of the stem 111. The spring 116 biases the stem 111 and the knob 112 in a counterclockwise direction as viewed in Figures 6 to 8, thereby biasing the shoulder 114 of said knob into engagement with the stop member 115.

As shown in Figures 1, 4 and 6 to 8, the stem 111 extends within the U-shaped abutment member 109 and carries for rotation therewith a cam 117 formed with projections 118 and 119 as shown in Figures 6 to 8. When the knob or finger piece 112 is in the position shown in Figures 6 and 8, the cam 117 assumes the corresponding position shown therein, and when the finger piece 112 is rotated clockwise to the reset position shown in Figure 7, the projection 119 of the cam 117 engages the abutment member 109 and moves the latter, together with the stem 106 and contact maker 63, to the left toward their safety position, thereby disengaging the contact maker 63 from the contact 61. At the same time the aforementioned rotation moves the projection 118 of the cam 117 into engagement with the actuating or abutment member 96 of the safety shut-off device 85, moving the latter to the right and thereby resetting the armature 93 into engagement with the pole faces of the electromagnet frame 190. It is apparent, therefore, that the power circuit to the electromagnetic operator 37 is interrupted during the resetting of the safety shut-off device 85.

On release of the knob 112, the torsion spring 116 returns said knob and the cam 117 to the position shown in Figures 6 and 8. If the electromagnet winding 91 is energized sufficiently to hold the armature 93 attracted to the pole faces of the magnet frame 90 against the bias of the spring 98, the abutment member 96 is correspondingly held in attracted position shown in Figures 4 and 8, and on return of the cam 117 to the position of Figure 8, the abutment member 109, stem 106 and contact maker 63 are permitted to move toward the right under the bias of the spring 107 and the contact maker 63 completes the circuit between the contacts 61 to effect energization of the primary winding 56 by current from the source 62. The primary winding 56 continues to be energized by current from the source 62 until subsequently deenergized by failure of said source or actuation of the contact maker 63 by release of the safety shut-off device 85, said released condition being illustrated in Figures 1, 6 and 9.

To summarize, in order to effect ignition of main burner 17, it is first necessary to ignite the pilot burner 18 which has its source of fuel supply upstream of valve 26 or entirely independent of the fuel supply to main burner 17, whichever may be most appropriate under the particular circumstances. The flame of pilot burner 18 will effect heating of the hot junction of thermocouple 99, thereby affording energization of electromagnet winding 91 so that subsequent rotation of release of knob 112 will cause armature 93 to be retained in attracted relation with respect to magnet core 90. Such retention of armature 93 in its attracted position, permits spring 107 to move contact maker 63 into engagement with contact 61, thereby effecting completion of the energizing circuit for primary winding 56, whereupon subsequent closure of the electrical contacts of thermostat 66 will cause rotor 39 to be rotated sufficiently to effect movement of valve 26 to its open or flow-permitting position. The fuel thus emitted through main burner 17 is, of course, ignited by the flame of pilot burner 18. If, after following this procedure, the rotor fails to rotate due to power failure and the main burner 17 remains unignited, it is necessary to open the valve 26 manually to effect main burner fuel flow by employing the manual valve opening means as above explained in detail.

It is apparent that the invention provides an improved line powered electromagnetically operated valve which may be cycled in response to predetermined conditions, for example temperature sensed by the thermostat 66, and which is also provided with manually operable means for moving the valve to open position and retaining said valve in said position in the event of failure of the line power. It is also apparent that the invention further provides safety shut-off means responsive to predetermined conditions and coacting with the electromagnetic valve operator as well as with the manually operable valve opening and retaining means for overcalling either of said operator or manually operable means to effect closure of the valve 26 on occurrence of one of said predetermined conditions, whether said one condition is outage of the pilot burner, or a condition to which the circuit controlling device 102 is responsive.

The specific illustrations and corresponding description herein set forth are used for the purpose of disclosure only and are not intended to impose unnecessary limitations on the claims, or to confine the patented invention to a particular use. Various changes and modifications may be made without departing from the spirit of the invention, and all of such changes are contemplated as may come within the scope of the appended claims.

What is claimed as the invention is:

1. Control apparatus comprising in combination an electric operator having a power circuit and having a movable armature biased toward one position and movable by energization of said operator toward an actuated position, energization of said operator requiring completion of said power circuit, switch means in said power circuit, manually operable means operatively coacting with said armature to effect disposition thereof in an actuated position during electric power failure, and condition responsive overcalling control means operable in response to a given condition during power failure while said armature is being held in an actuated position by said manually operable means to overcall said manually operable means and move said armature to its said one position and to thereafter render said manually operable means ineffective to move said armature toward said actuated position during existence of said condition, said overcalling means also coacting with said switch means in response to said given condition to cause the latter to open said power circuit and thereby prevent energization of said operator during existence of said given condition.

2. Control apparatus comprising in combination an electric operator having a movable armature biased toward one position and movable by energization of said operator toward an actuated position, manually operable means operatively coacting with said armature to effect disposition thereof in an actuated position during failure of electric power to said operator, and condition responsive overcalling control means comprising a movable actuating member biased toward a safety position preventing actuation of said armature by said operator or manually operable means, said actuating member being movable against its said bias toward an operating position permitting actuating of said armature by said operator or manually operable means, said overcalling control means also comprising releasable holding means for holding said actuating member in its said operating position when moved thereto, said holding means being responsive to a given condition while said armature is being held in an actuated position by said manually operable means during power failure to release said actuating member for movement toward its safety position under its bias, said actuating member on release overcalling said manually operable means and moving said armature toward its said one position and rendering said operator and manual means ineffective to thereafter move said armature toward its actuated position during existence of said condition.

3. A device for controlling the flow of fluid fuel or the like, comprising a flow controlling member biased toward one flow controlling position and movable toward another flow controlling position, a cycling electric operator having a rotatable armature operatively connected to said flow controlling member for actuation of the latter to said another flow controlling position on energization of said operator, manually operable means operatively coacting with said armature to effect rotation thereof and thereby movement of said flow controlling member to its said another flow controlling position during failure of electric power to said operator, and condition responsive overcalling control means comprising a movable actuating member coacting directly with said manually operable means and being biased toward a safety position preventing rotation of said armature by said manually operable means, said actuating member being movable against its said bias to an operating position permitting rotation of said armature by said manually operable means, said overcalling control means also comprising releasable holding means for holding said actuating member in its said operating position when moved thereto, said holding means being responsive to a given condition during power failure while said flow controlling member is being held in its said another flow controlling position by said manually operable means to release said actuating member for movement toward its safety position under its bias, said actuating member on release overcalling said manually operable means and rotating said armature toward its initial position to return said flow controlling member to its said one flow controlling position and to render said manual means ineffective to thereafter move said armature and flow controlling member during existence of said condition.

4. A device for controlling the flow of fluid fuel or the like, comprising a flow controlling member biased to a flow-preventing position and movable to a flow-permitting position, a cycling electric operator having a rotatable armature operatively connected to said flow controlling member for actuation of the latter to flow-permitting position on energization of said operator, manually operable releasable armature actuating and retaining means operatively coacting with said armature to effect rotation thereof and thereby movement of said flow controlling member to flow-permitting position during failure of electric power to said operator, said means being movable between an inoperative position toward which it is normally biased and an operative position, movement to said operative position causing rotation of said armature to an actuated position and thereby movement of said flow controlling member to flow-permitting position, said armature and hence said flow controlling member being held in said position by said actuating and retaining means when said means reaches said operative position, and condition responsive overcalling control means positioned for direct coaction with said actuating and retaining means and comprising a movable actuating member biased toward a safety position preventing rotation of said armature by said manually operable means, said actuating member being movable against its said bias to an operating position permitting rotation of said armature by said manually operable means, said overcalling control means also comprising releasable holding means for holding said actuating member in its said operating position when moved thereto, said holding means being responsive to a given condition during power failure while said armature is held in its said actuated position and said flow controlling member is held in its said flow-permitting position by said actuating and retaining means to release said actuating member for movement toward its safety position under its bias, said actuating member on release moving into coacting relation with and overcalling said actuating and retaining means to thereby effect release of said armature from retention thereby and permit movement of said flow controlling member to flow-preventing position under its bias and return of said actuating and retaining means to its inoperative position under its bias.

5. A device for controlling the flow of fluid fuel or the like, comprising, a flow controlling member having means biasing the same toward a first and movable against said bias toward a second flow controlling position, an electric operator having a movable armature operatively connected to said flow controlling member and being operable when energized to move said armature and thereby said flow controlling member from said first to said second flow controlling position, manually operable means operatively coacting with said flow controlling member to move the latter to its said second flow controlling position during failure of energization of said operator, and condition responsive overcalling control means operable in response to a given condition to overcall both said operator and said manually operable means and to effect movement of said flow controlling member from its said second to its said first flow controlling position if said flow controlling member is disposed in its said second flow controlling position by either said operator or manually operable means on occurrence of said given condition.

6. A device for controlling the flow of fluid fuel or the like, comprising, a flow controlling member having means biasing the same toward a first and movable against said bias toward a second flow controlling position, an electric operator having a movable armature operatively connected to said flow controlling member and being operable when energized to effect movement of said armature and thereby said flow controlling member from said first to said second flow controlling position, manually operable means operatively coacting with said flow controlling member to move the latter to its said second flow controlling position and retain said flow controlling member in its said second position during failure of energization of said operator, and condition responsive overcalling control means operable in response to a given condition to overcall both said operator and said manually operable means and effect movement of said flow controlling member from its said second to its said first flow controlling position if said flow controlling member is disposed in its said second flow controlling position by either said operator or manually operable means on occurrence of said given condition.

7. A device for controlling the flow of fluid fuel or the like, comprising, a flow controlling member having means biasing the same toward a first and movable against said bias toward a second flow controlling position, an electric operator having a movable armature operatively connected to said flow controlling member and being operable when energized to effect movement of said armature and thereby said flow controlling member from said first to said second flow controlling position, manually operable means operatively coacting with said flow controlling member to move the latter to its said second flow controlling position and retain said flow controlling member in its said second position during failure of energization of said operator, and condition responsive overcalling control means operable in response to a given condition, during failure of energization of said operator while said flow controlling member is being retained in its said second flow controlling position by said manually operable means, to overcall said manually operable means and effect movement of said flow controlling member to its said first flow controlling position and to render said manually operable means ineffective to thereafter move said flow controlling member toward or retain the same in its said second flow controlling position during existence of said given condition.

8. In a device of the class described, a flow control member having means biasing the same toward a first and movable against said bias toward a second flow controlling position, an electric operator operatively connected to said flow control member and energizable to move the latter against said bias from said first to said second flow controlling position, manually operable means operatively associated with said flow control member to effect disposition thereof in its said second flow controlling position during failure of energization of said operator, and condition responsive overcalling control means operable in response to a given condition while said flow control member is held in its said second position by said manually operable means during power failure to overcall said manually operable means and effect movement of said control member under the bias of said biasing means from its said second to its said first flow controlling position.

9. In a device of the class described, a flow control member having means biasing the same toward a first and movable against said bias toward a second flow controlling position, an electric operator operatively connected to said flow control member and energizable to move the latter against said bias from said first to said second flow controlling position, manually operable actuating and retaining means operatively associated with said flow control member to move said flow control member to and retain the same in its said second flow controlling position against said bias during failure of energization of said operator, and condition responsive overcalling control means operable in response to a given condition while said flow control member is disposed in its said second flow controlling position by either said operator or said manually operable means to overcall the one of said operator and manually operable means effecting said flow control member disposition and effect movement of said flow control member under the bias of said biasing means from its said second to its said first flow controlling position and thereafter render said manually operable means incapable of moving said flow control member to its said second flow controlling position as long as said given condition exists.

10. A control device comprising, in combination, a control member biased toward an operating position and movable toward a safety position, an actuating member biased toward a safety position and having an operating position, means for holding said actuating member in operating position when moved thereto, abutment means operatively associated with said control and actuating members for moving said control member to its safety position by movement of said actuating member to its safety position under its bias, means for resetting said actuating member to its operating position in holding cooperation with said holding means and for moving said control member to its safety position during the resetting operation, a valve biased toward closed position, an electromagnetic operator connected to said valve and operable when energized to open the latter, connections between said operator and said control member effecting deenergization of said operator by movement of said control member to its safety position, and manually operable means for opening said valve during electric power failure, the abutment means associated with said actuating member being positioned to coact with said manually operable means when said valve is being held open by said manual opening means during power failure to overcall said manual opening means and effect closure of said valve under its closing bias by movement of said actuating member to safety position.

References Cited in the file of this patent
UNITED STATES PATENTS

| | | |
|---|---|---|
| 2,159,624 | Shipley | May 23, 1939 |
| 2,309,709 | Paille | Feb. 2, 1943 |
| 2,358,999 | Ray | Sept. 26, 1944 |
| 2,622,622 | Ray | Dec. 23, 1952 |
| 2,661,013 | Eskin et al. | Dec. 1, 1953 |
| 2,687,738 | Thornbery | Aug. 31, 1954 |
| 2,699,477 | Sogge | Jan. 11, 1955 |
| 2,753,931 | Ray | July 10, 1956 |
| 2,871,930 | Drow | Feb. 3, 1959 |
| 2,877,323 | Naber | Mar. 10, 1959 |